Patented June 9, 1942

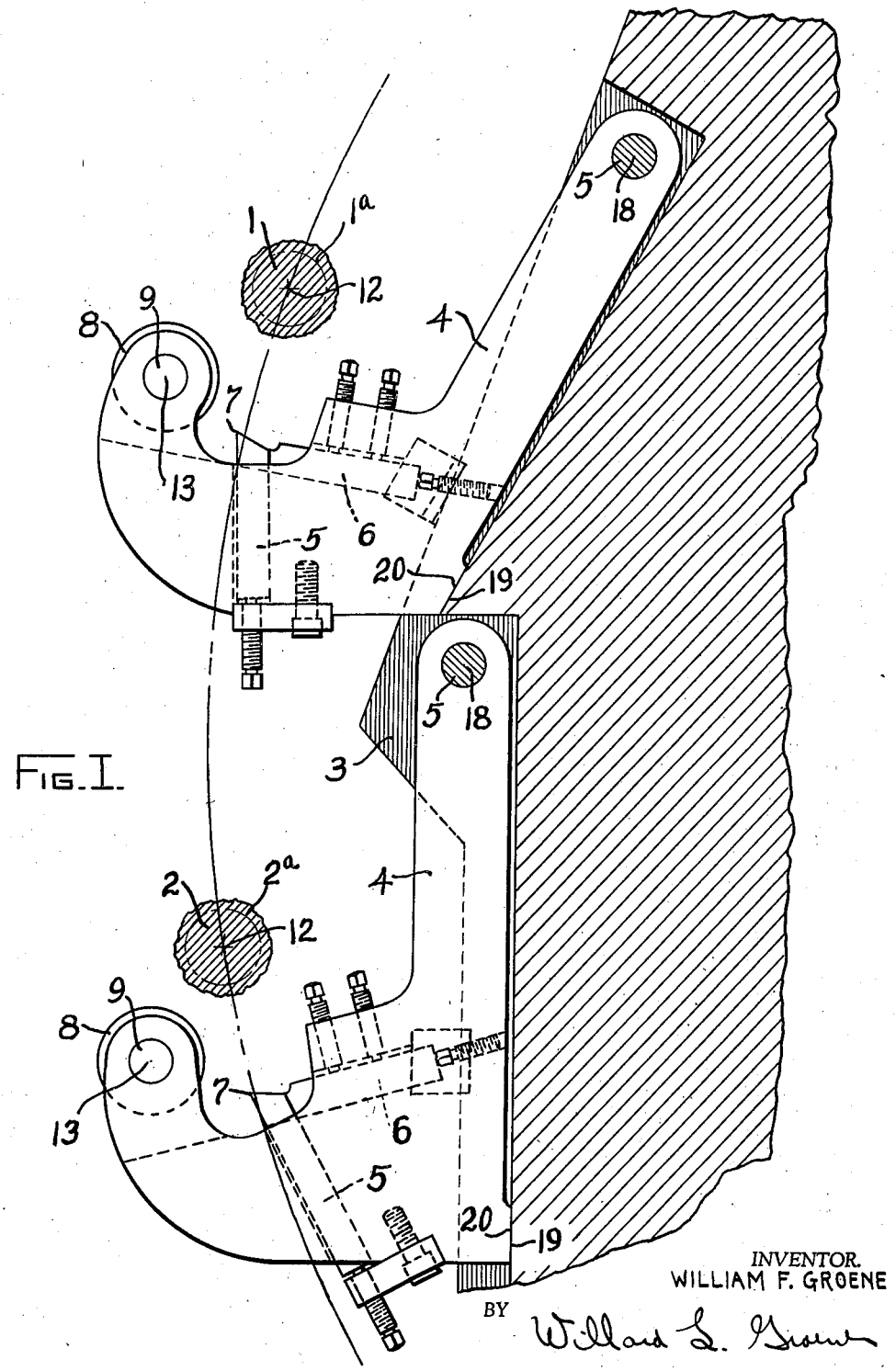

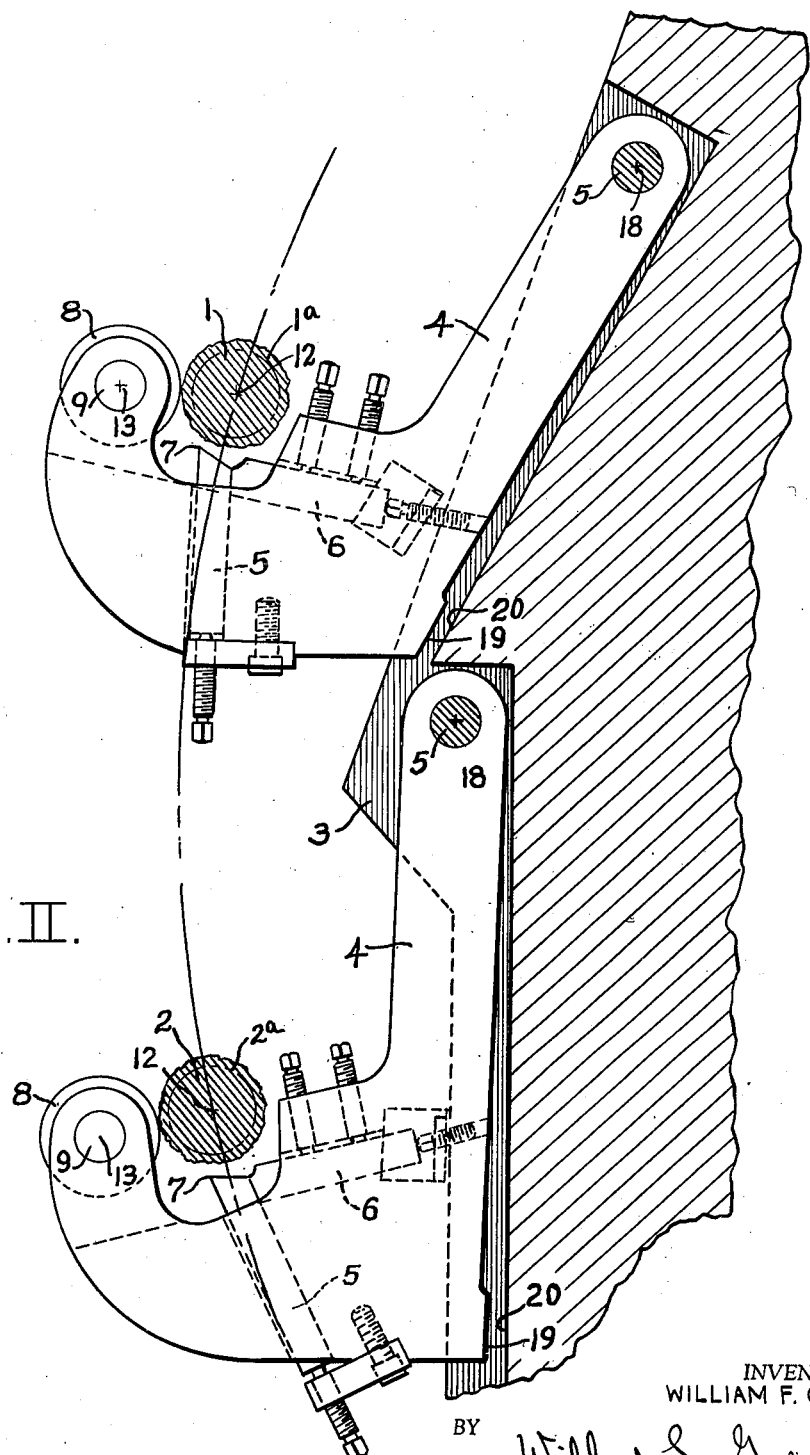

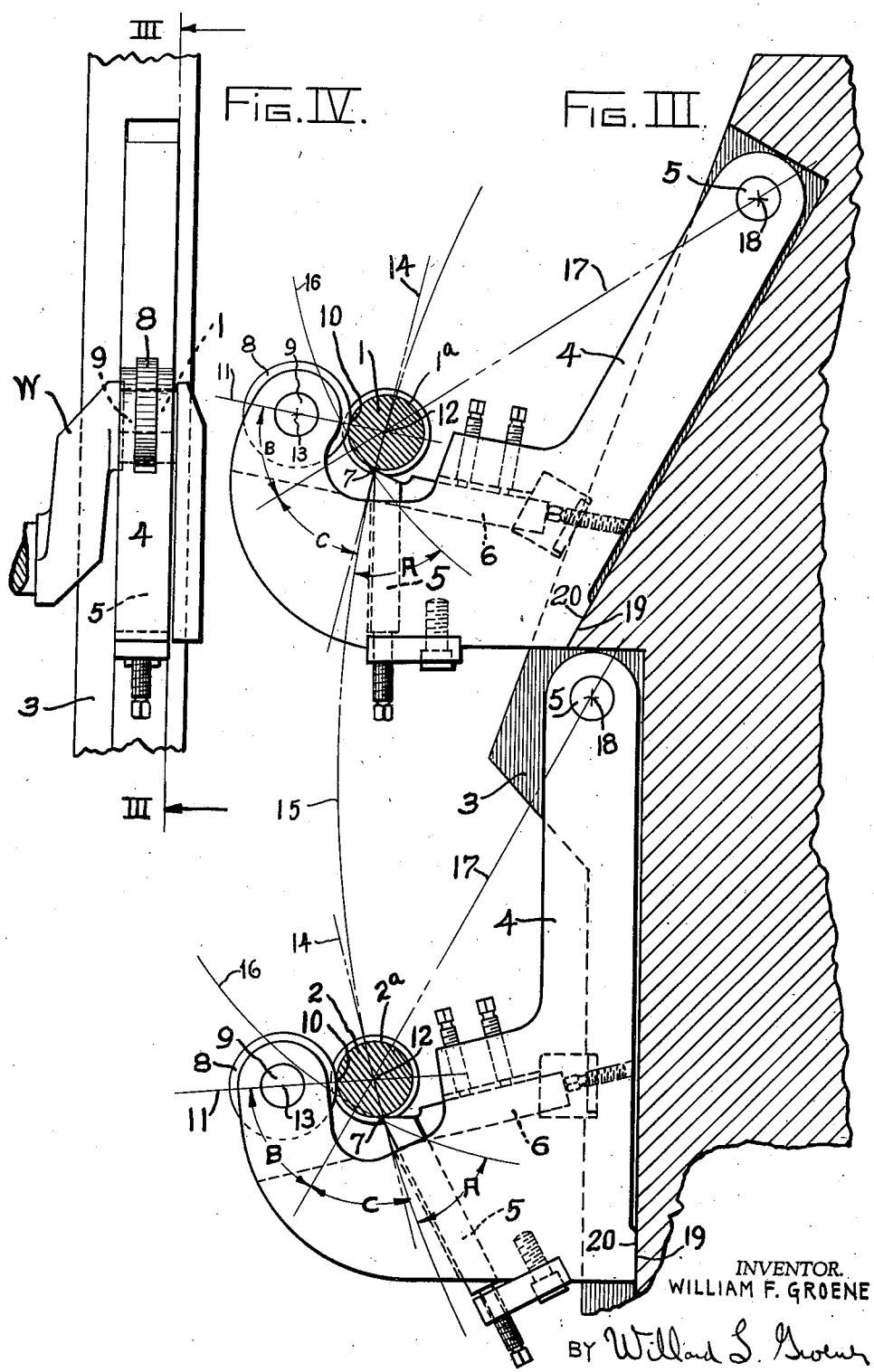

2,285,771

UNITED STATES PATENT OFFICE 2,285,771

TOOL HOLDER FOR LATHES

William F. Groene, Cincinnati, Ohio, assignor to
The R. K. Le Blond Machine Tool Company,
Cincinnati, Ohio, a corporation of Delaware Application October 18, 1940, Serial No. 361,748

7 Claims. (Cl. 82—35)

This invention pertains to a tool holder for lathe and is particularly adapted for use in conjunction with orbital lathes of the multiple spindle type, such for example, as shown in Patent #2,138,964 of William F. Groene, dated December 6, 1938, in which a plurality of crankshafts are to have their crank pins simultaneously turned in a multiple spindle orbital lathe.

The object of this invention is to provide a series of movably mounted or floating tool holders on the orbitally moving tool carrier of such a lathe. These tool holders are to carry cutting tools fixed thereon and also these tool holders are to have work engaging portions which contact the work surface being machined so as to limit the relative floating movement of the tool holder with respect to the work carrier. It is also the object to provide in conjunction with the above arrangement of floating tool holder, an abutment means operating in conjunction with the work carrier to also limit the floating movement of the tool holder when the work engaging portion of said tool holder is rendered inoperative to control this floating movement of the tool holder.

Particularly is this limiting abutment means effective in conjunction with the tool holder effective at the time when the tool and tool holder are fully retracted from the work piece and also at the instant when the work is finally brought down to finish sized dimension.

Another object of this invention is to provide in a lathe having a tool feeding carrier, a tool holder pivotally mounted on such a tool carrier and having a cutting tool fixed therein and a work engaging portion thereon adapted to engage the work being machined at a point 90° circumferentially removed from the point of contact of the cutting edge of said tool on said work piece, and in which arrangement the axis of pivoting of the tool holder is located in a line passing through the axis of rotation of the work being turned which bisects the angle formed by a plane passing through the axis of the work and the point of contact of the work contacting portion of the tool holder and the plane defined by the axis of the work and the cutting edge of the cutting tool.

A still further object of this invention is to provide a floating tool holder mounted on a tool feeding carrier in which the direction of floating movement of the cutting edge of the cutting tool fixed in said tool holder takes place in a direction of the feeding of the cutting edge of said tool relative to the work being machined.

And a still further object of this invention is to provide a floatingly mounted tool holder on a work carrier in which the cutting edge of the cutting tool, mounted on said tool holder, has floating movement in a direction substantially parallel to a plane passing through the cutting edge of the tool and the point of contact of the floating tool holder on the work surface being turned.

Further features and advantages of this invention will appear from the detailed description of the drawings in which:

Figure I is a fragmentary sectional view through a portion of the orbital tool carrier of a lathe as shown in the above mentioned patent, showing the relative position of the tool holders when in withdrawn position away from the work piece at the beginning of the cutting cycle.

Figure II shows the relative position of the tool holders just at the beginning of their contact with the work pieces.

Figure III is a similar fragmentary sectional view showing the relative position of the tool holders at the time of completion of the final sizing of the work pieces at the end of the cutting cycle, shown on the line III—III of Figure IV.

Figure IV is a front fragmentary elevation showing one of the tool holders and its relative sidewise position on a crank pin of a crankshaft.

For illustrative purposes, this invention is shown applied to a multiple spindle orbital lathe having work spindles in which are mounted the work piece or crankshafts W, having the respective bearing portions 1 and 2. However, it is to be understood that this tool holder could as well be applied to any form of lathe in which rotatable work is to be turned and in which there is a tool feeding device or slide upon which the unique floating tool holders might be mounted.

The lathe has the usual tool feeding carrier 3, which may be actuated in orbital motion in this instance to follow the respective crank pins 1 and 2 of the crankshafts, and upon which is pivotally mounted the tool holders 4 on suitable pivot pins 5 in the carrier 3. In these tool holders 4 are fixed the cutting tools 6, which present a cutting edge 7 to the work surface 1a or 2a, to be turned on the work. Also fixed on the tool holder 4, is the work contacting roller 8 suitably journaled on the stud 9 fixed in the outer end of the tool holder 4. It is to be noted, particularly in Figure III, that the roller 8 contacts the work at a point 10, which is substanstantially 90° circumferentially removed from contact with the surface 1a or 2a, relative to the point of contact of the cutting edge 7 of the tool with this surface. Expressed in another way, the point of contact of the roller 8 with the work lies in a plane defined by the line 11 which passes through the center of the work 12 and the axis of rotation of the roller 8, so that it lies substantially perpendicular to the plane defined by the line 14 which passes through the axis of rotation of the work 12 and the cutting edge 7 of the tool. It also is to be further noted that for the relatively small amount of feed movement necessary, the line 14 lies substantially parallel to the direction of feeding indicated by the arcuate line 15 as affected by movement of the cutting edges 7 of the tools along this line 15 by appropriate feeding of the tool carrier 3 as fully explained in the above mentioned patent.

The tool holder has pivotal floating motion or floating motion for the tool with its cutting edge 7 moving in the arcuate line 16 or in an equivalent straight line which lies at substantially a 45° angular relationship to that of the direction of feed 15 and the line 11 defining the point of contact of the tool holder with the work surface being machined, so that the angle A is substantially a 45° angle or expressed another way, the floating motion takes place substantially in a plane passing through the cutting edge of the tool and the point of contact of the tool holder with the work.

Further, it is to be noted that the line 17, which passes through the point of pivoting 18 of the tool holder about the pin 5 fixed in the tool carrier, and passing through the center of rotation 12 of the work, passes substantially midway between the cutting edge 7 and the point of contact 10 of the roller 8 with the work surface being turned, so that this line 17 substantially bisects the right angle between the lines 11 and 14, thus making the angles B and C each substantially 45°.

Also in conjunction with these pivotally mounted tool holders, whose floating motion is controlled by contact of the roller 8 with the crank pins 1 and 2 of the crankshafts being turned, is a limiting abutment means arranged to function when the roller 8 is not in contact with the work piece so as to properly position the tool holder with the cutting edge of the cutting tool in proper relationship to the work surface being turned.

This arrangement comprises an abutment surface 19 formed on each of the tool holders which is arranged to contact the surface 20 of the tool feeding carrier 3, so as to limit the floating movement of the tool holder in the direction of tool cutting pressure which takes place substantially along the line 16 extending away from the work contacting roller 8 in order that when this roller 8 is not in engagement with the work, the tool holder will still be held in correct position and substantially rigidly in so far as the cutting action of the tools on the work is concerned.

For example, when the tool holders are initially in withdrawn position as shown in Figure I, these abutment surfaces 19 and 20 are then in firm contact so as to have the tool in substantially correct relationship at the beginning of the cutting cycle. As the tools feed up toward the work as shown in Figure II, the roller 8 then comes in contact with the rough irregular work surface of the work pieces 1 and 2, causing the tool holder to move with its abutment 19 away from the surface 20 to permit its free floating movement to accommodate itself without damage or difficulty to the rough surface of the work piece, as the cutting tools 5 and 6 begin their initial cutting on the work surface. As the work surface is being turned down to the ultimate finished smooth diameter, the roller being constantly engaged with this turned surface, the tool holder gradually begins to swing back to the position shown in Figure III until the surfaces 19 and 20 again become engaged, at which time the work is then turned to accurate dimension and the contact roller 8 is then just lightly contacting the work at this point, so that a highly accurate finished condition of the work piece results and this also prevents the tool holder from tending to swing too far toward the work carrier as shown in Figure III, during the final finish operation, which might result in inaccurate turning of the work, due to this excessive floating movement of the tool holders during the final finishing operation. Therefore this work contacting abutment acts to normally substantially position the tool in correct position when it is not operating upon the work piece and most important, serves to accurately limit the floating movement of the tool holder automatically as the work is brought down to final sized dimension.

Having thus fully set forth and described my invention, what I claim as new and desire to secure by United States Letters Patent is:

1. In a lathe, a tool feeding carrier, a tool holder floatingly mounted on said carrier, a cutting tool fixed in said tool holder, having its cutting edge arranged to be fed radially of a work piece in said lathe, a work contacting portion on said tool holder engaging said work piece at a point substantially 90° circumferentially removed from the point of contact of the cutting edge of said cutting tool with said work piece so that the point of contact of said contacting portion lies in a plane passing through the axis of rotation of the work which is substantially perpendicular to a plane passing through the axis of rotation of the work and the cutting edge of said tool, and means for effecting floating movement of the cutting edge of said cutting tool in a direction substantially at a 45° angular relationship to either of said mentioned planes.

2. In a lathe, a tool feeding carrier, a tool holder floatingly mounted on said carrier, a cutting tool fixed in said tool holder, having its cutting edge arranged to be fed radially of a work piece in said lathe, a work contacting portion on said tool holder engaging said work piece at a point substantially 90° circumferentially removed from the point of contact of the cutting edge of said cutting tool with said work piece so that the point of contact of said contacting portion lies in a plane passing through the axis of rotation of the work which is substantially perpendicular to the plane of feeding of said cutting edge of said tool relative to said work, and means for effecting floating movement of the cutting edge of said cutting tool in a direction substantially at a 45° angular relationship to either of said mentioned planes.

3. In a lathe, a tool feeding carrier, a tool holder floatingly mounted on said carrier, a cutting tool fixed in said tool holder, having its cutting edge arranged to be fed radially of a work piece in said lathe, a work contacting portion on said tool holder engaging said work piece at a point substantially 90° circumferentially removed from the point of contact of the cutting edge of said cutting tool with said work piece so that the point of contact of said contacting portion lies in a plane passing through the axis of rotation of the work which is substantially perpendicular to the plane of feeding of said cutting edge of said tool relative to said work, and means for effecting floating movement of the cutting edge of said cutting tool in a direction substantially at a 45° angular relationship to either of said mentioned planes, and means between said carrier and said tool holder for limiting said floating movement of said tool holder when said work contacting portion of said tool holder is disengaged from contact with said work piece.

4. In a lathe, a tool feeding carrier, a tool holder pivotally mounted on said carrier, a cutting tool fixed in said tool holder having its cutting edge arranged to be fed radially of a work piece in said lathe, a work contacting portion on said tool holder engaging said work piece at a point substantially 90° circumferentially removed from the point of contact of the cutting edge of said cutting tool with said work piece, said axis of pivotal movement of said tool holder lying in a plane passing through the axis of rotation of the work and passing mid-way between the point of contact of the cutting edge of the tool and the point of contact of the work contacting portion of said tool holder with the work.

5. In a lathe, a tool feeding carrier, a tool holder pivotally mounted on said carrier, a cutting tool fixed in said tool holder having its cutting edge arranged to be fed radially of a work piece in said lathe, a work contacting portion on said tool holder engaging said work piece at a point substantially 90° circumferentially removed from the point of contact of the cutting edge of said cutting tool with said work piece, said axis of pivotal movement of said tool holder lying in a plane passing through the axis of rotation of the work and passing mid-way between the point of contact of the cutting edge of the tool and the point of contact of the work contacting portion of said tool holder with the work, and means between said carrier and said tool holder for limiting said floating movement of said tool holder when said contacting portion of said tool holder is disengaged from contact with said work piece.

6. In a lathe, a tool feeding carrier, a tool holder, floating mounting means for said tool holder on said carrier, a cutting tool fixed in said tool holder, means on said tool holder for contacting a work piece in said lathe to limit the floating movement of said tool holder, means for feeding said tool radially of the axis of rotation of said work piece, and means whereby said floating mounting means effects floating movement of the cutting edge of said tool in a plane lying in a 45 degree angular relationship to the direction of radial feeding movement of the cutting edge of said tool.

7. In a lathe, a tool feeding carrier, a tool holder, floating mounting means for mounting said tool holder on said carrier, a cutting tool fixed in said tool holder, means on said tool holder for contacting the work piece in said lathe to limit the floating movement of said tool holder, means for feeding the cutting edge of said tool radially of the axis of rotation of said work piece, and means whereby said floating mounting means for said tool holder causes floating movement of the cutting edge of said tool in a plane passing through the cutting edge of the tool and point of contact of the tool holder with the work piece, said plane lying in a 45 degree angular relationship to the direction of radial feeding movement of the cutting edge of said tool.

WILLIAM F. GROENE.